United States Patent
Passe et al.

(10) Patent No.: US 12,103,696 B2
(45) Date of Patent: Oct. 1, 2024

(54) HIGH-SPEED VTOL DRIVE-SHAFT SYSTEMS AND METHODS

(71) Applicant: Textron Innovations Inc., Providence, RI (US)

(72) Inventors: Bradley Passe, Irving, TX (US); Kip Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 9 days.

(21) Appl. No.: 17/721,200

(22) Filed: Apr. 14, 2022

(65) Prior Publication Data

US 2023/0331393 A1    Oct. 19, 2023

(51) Int. Cl.
| | | |
|---|---|---|
| *B64D 35/00* | (2006.01) | |
| *B64C 29/00* | (2006.01) | |
| *B64D 27/10* | (2006.01) | |
| *B64D 27/16* | (2006.01) | |

(52) U.S. Cl.
CPC .......... *B64D 35/00* (2013.01); *B64C 29/0033* (2013.01); *B64D 27/10* (2013.01); *B64D 27/16* (2013.01)

(58) Field of Classification Search
CPC .... B64D 35/00; B64D 35/04; B64C 29/0033; B64C 29/005
See application file for complete search history.

(56) References Cited

U.S. PATENT DOCUMENTS

| | | | | |
|---|---|---|---|---|
| 2,326,104 | A * | 8/1943 | Petrich | B64D 35/04 |
| | | | | 244/65 |
| 6,065,933 | A * | 5/2000 | Secord | B63H 1/22 |
| | | | | 416/165 |
| 2017/0297679 | A1* | 10/2017 | Elliott | B64D 35/08 |
| 2021/0107665 | A1* | 4/2021 | Sinha | G05D 1/101 |
| 2022/0266996 | A1* | 8/2022 | Karem | B64C 3/56 |
| 2023/0025666 | A1* | 1/2023 | Bianco Mengotti | B64C 3/52 |

FOREIGN PATENT DOCUMENTS

| | | | | |
|---|---|---|---|---|
| EP | 2778063 A1 * | 9/2014 | | B64C 29/0033 |
| EP | 3299279 A1 * | 3/2018 | | B64C 11/28 |
| EP | 3461737 B1 * | 3/2020 | | B64C 1/061 |
| FR | 3122646 A1 * | 11/2022 | | |

OTHER PUBLICATIONS

Goldstein, D.N., Rotorcraft Convertible Engine Study Final Report, Aug. 1983, NASA Lewis Research Center, pp. 1-4, accessible at https://ntrs.nasa.gov/citations/19830026673. (Year: 1983).*

* cited by examiner

*Primary Examiner* — Assres H Woldemaryam
*Assistant Examiner* — Anna L. Gordon
(74) *Attorney, Agent, or Firm* — Bradley Arant Boult Cummings LLP

(57) ABSTRACT

An aircraft includes a fuselage, a pylon, a wing positioned between the fuselage and the pylon, and a plurality of drive shafts located inside the wing and adapted to drive a rotor associated with the pylon.

19 Claims, 5 Drawing Sheets

HIGH-SPEED VTOL DRIVE-SHAFT SYSTEMS AND METHODS

TECHNICAL FIELD

This disclosure relates in general to the field of drive shafts in vertical takeoff and landing ("VTOL") aircraft, and more particularly, but not by way of limitation, to systems and methods for reducing wing dimensions via multiple drive shafts in VTOL aircraft.

BACKGROUND

This section provides background information to facilitate a better understanding of various aspects of the disclosure. It should be understood that the statements in this section of this document are to be read in this light and not as admissions of prior art.

In some VTOL aircraft such as, for example, VTOL tiltrotor aircraft, drive shafts are employed that run down the wings of the aircraft. The drive shafts carry torque to pylons that power rotors housed by the pylons. In order to make the drive shafts structurally acceptable, the drive shafts are generally relatively large in diameter. As such, cross-sectional dimensions of wings within which the drive shafts are housed become larger in order to accommodate the drive shafts.

SUMMARY

An aircraft includes a fuselage, a pylon, a wing positioned between the fuselage and the pylon, and a plurality of drive shafts located inside the wing and adapted to drive a rotor associated with the pylon.

An aircraft includes a wing positioned between a fuselage and a pylon of the aircraft, a convertible engine, and a plurality of drive shafts located in the wing and adapted to transmit torque from the convertible engine to drive a rotor associated with the pylon.

A method of powering an aircraft includes generating torque, via a convertible engine operable in a turbofan mode and a turboshaft mode. The method also includes a plurality of drive shafts located within a wing of the aircraft receiving the generated torque and transmitting torque to drive a rotor associated with a pylon of the aircraft.

This summary is provided to introduce a selection of concepts that are further described below in the Detailed Description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following Detailed Description when read with the accompanying Figures. It is emphasized that, in accordance with standard practice in the industry, various features are not necessarily drawn to scale. In fact, the dimensions of various features may be arbitrarily increased or reduced for clarity of discussion.

DETAILED DESCRIPTION

Figure 1:
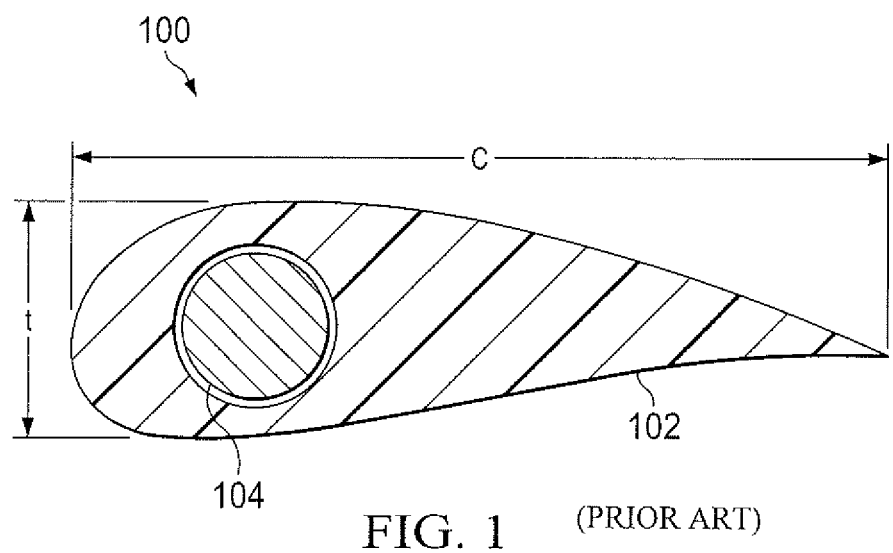
FIG. 1 is a schematic cross-sectional view of a representative wing with a single drive shaft contained therein.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a Figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following Detailed Description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

At speeds approaching the speed of sound, the effects of Bernoulli's principle over curves on the wing and fuselage of an aircraft can accelerate local air flow to supersonic speeds. This creates a shock wave that produces a powerful form of drag known as wave drag and gives rise to the concept of the sound barrier. The speed at which these shocks first form, critical Mach, is a function of the amount of curvature of the wing. In order to reduce wave drag, wings should have the minimum curvature possible while still generating the required amount of lift. As a result, the main reason for decreasing a thickness-to-chord ratio ("t/c") of the wing is to delay the compressibility effect related to higher Mach numbers, delaying the onset of shock wave formation. The natural outcome of this requirement is a wing design that is thin and wide and therefore has a relatively low value of t/c.

It is generally understood that, all other things being equal, the thinner a wing is cross-sectionally, the higher a Mach number at which shocking will occur, which shocking causes drag on the aircraft. As a consequence, if it is desirable for the aircraft to fly fast, the wing should be made thinner in order to increase the Mach number at which shocking, and attendant wave drag, occurs.

FIG. 1 is a schematic cross-sectional view of a representative wing 100 with a single drive shaft contained therein. The wing 100 has a profile 102 and a drive shaft 104 is contained within the profile 102. The presence of the single, relatively large, drive shaft 104 causes a cross-section of the wing 100 to be relatively thick, which can serve to hamper high-speed performance of an aircraft that incorporates the wing 100. The drive shaft 104 can also serve to necessitate a straighter leading edge of the wing 100, which can result in zero to minimal sweep to the wing 100. Also illustrated in FIG. 1 are thickness ("t") and chord ("c") of the wing 100.

The thickness-to-chord ratio ("t/c") compares the maximal vertical thickness of the wing 100 to the chord thereof. t/c is a key measure of the performance of a wing when the wing operates at transonic speeds. In contrast to the wing 100, if multiple smaller drive shafts are housed within a wing, the wing can be designed with lower t/c as well as improved wing sweep and taper, which can serve to reduce drag and allow for higher transonic cruise speeds by delaying the onset of shock wave formation on the wing surface.

Figure 2:
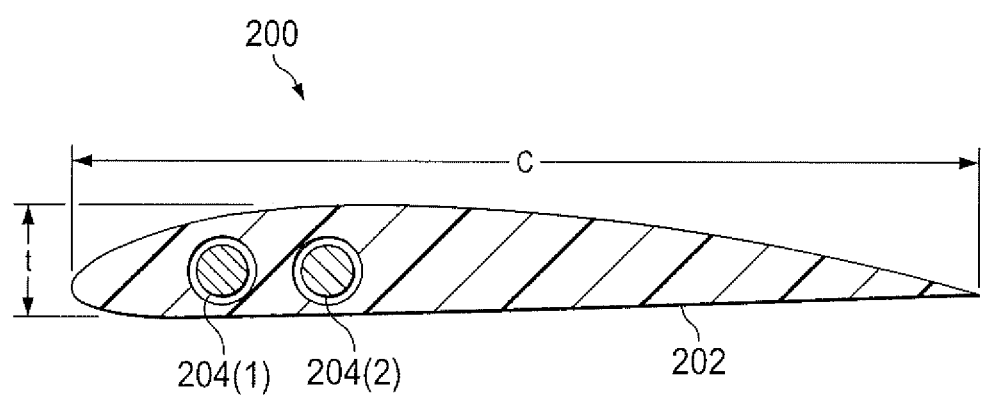
FIG. 2 is a schematic cross-sectional view of a representative wing with two drive shafts contained therein.

FIG. 2 is a schematic cross-sectional view of a representative wing 200 with two drive shafts 204(1) and 204(2) contained therein. The wing 200 has a profile 202 and the drive shafts 204(1) and 204(2) are contained within the profile 202. The presence of the multiple, relatively smaller, drive shafts 204(1) and 204(2) allow a cross-section of the wing 200 to be relatively thin in comparison to the wing 100, which, all other things being equal, can serve to improve high-speed performance of an aircraft that incorporates the wing 200. The drive shafts 204(1) and 204(2) can also serve to permit a less straight leading edge of the wing 100, which can result in greater sweep to the wing 200 relative to the wing 100. FIG. 2 illustrates that t/c of the wing 100 is greater than t/c of the wing 200. As noted above, t/c is a key measure of the performance of a wing when the wing operates at transonic speeds. In contrast to the wing 100, the multiple smaller cross-sectional drive shafts 204(1) and 204(2) housed within the wing 200 allow the wing 200 to have a lower t/c as well as improved wing sweep and taper, which can serve to reduce drag and allow for higher transonic cruise speeds by delaying the onset of shock wave formation on the wing surface.

Figure 3:
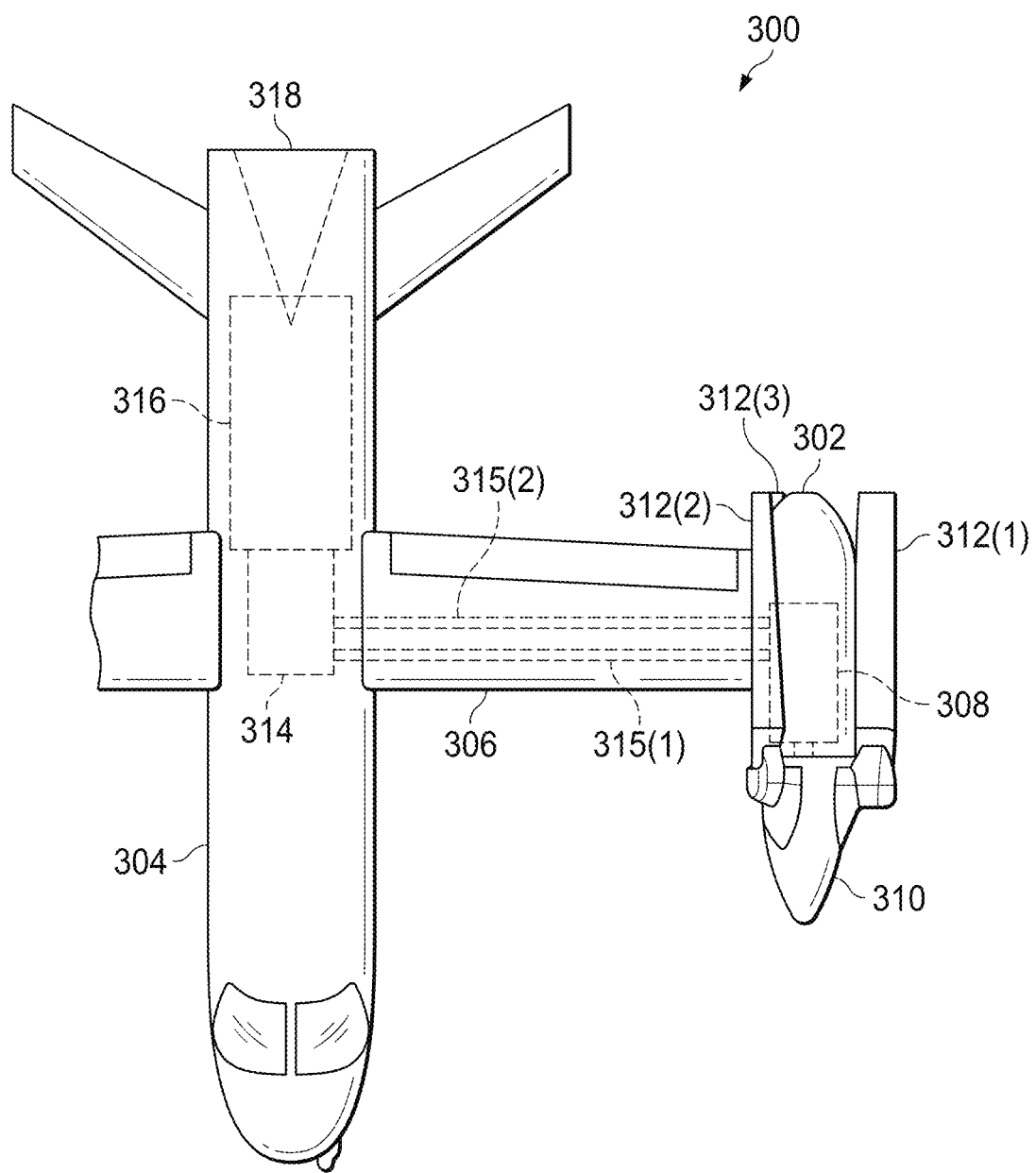
FIG. 3 is a top partial view of a tiltrotor VTOL aircraft with fixed pylons.

FIG. 3 is a top partial view of a tiltrotor VTOL aircraft 300 with fixed pylons, a fixed pylon 302 being illustrated therein. The tiltrotor VTOL aircraft 300 also includes a fuselage 304 and a wing 306 that connects the fixed pylon 302 and the fuselage 304. The fixed pylon 302 includes a gearbox 308 connected to a rotor 310. The rotor 310 has a plurality of rotor blades 312(1)-(3) connected thereto, the plurality of rotor blades 312(1)-(3) being shown in a folded position. Those having skill in the art will appreciate that the plurality of rotor blades 312(1)-(3) can be operated in an unfolded position. Although three rotor blades 312(1)-(3) are illustrated, other numbers of rotor blades are possible.

Illustrated within the fuselage 304 is a turboshaft 314 interoperably coupled to a pair of drive shafts 315(1)-(2) within the wing 306 and driven by a convertible engine 316. The convertible engine 316 may operate is a turbofan mode and in a turboshaft mode in which the convertible engine 316 drives the drive shafts 315(1)-(2) by transmitting torque through the turboshaft 314 through the wing to the gearbox 308 in the fixed pylon 302 to power the plurality of rotor blades 312(1)-(3). In a typical embodiment, the turboshaft mode is used for at least one of low-speed flight and vertical takeoff and landing ("VTOL"). In similar fashion, in some embodiments, in high-speed flight, the rotor 310 turns off and the rotor blades 312(1)-(3) may fold and the turbofan mode be used. Use of a plurality of drive shafts such as the drive shafts 315(1) and 315(2) permits a reduction in driveshaft cross-sectional area, which allows for better wing shaping for high-speed flight, which can serve to improving one or more of fuel consumption, maximal cruise speed, and range of the tiltrotor VTOL aircraft 300.

Figure 4:
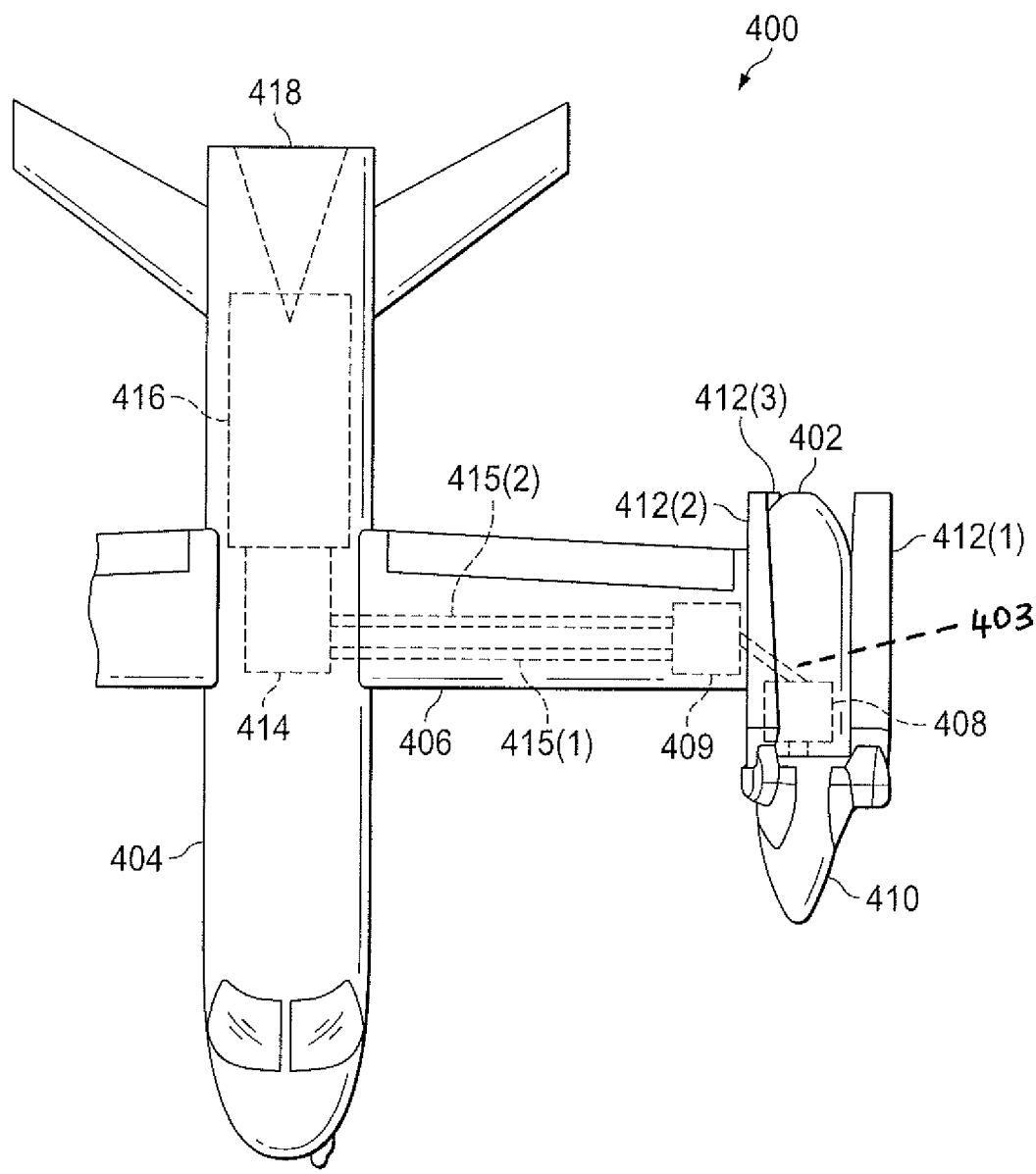
FIG. 4 is a top partial view of a tiltrotor VTOL aircraft with converting pylons.

FIG. 4 is a top partial view of a tiltrotor VTOL aircraft 400 with converting pylons, a converting pylon 402 being illustrated therein. The tiltrotor VTOL aircraft 400 also includes a fuselage 404 and a wing 406 that connects the converting pylon 402 and the fuselage 404. The converting pylon 402 includes a pylon gearbox 408 connected to a rotor 410. The rotor 410 has a plurality of rotor blades 412(1)-(3) connected thereto, the plurality of rotor blades 412(1)-(3) being shown in a folded position. Those having skill in the art will appreciate that the plurality of rotor blades 412(1)-(3) can be operated in an unfolded position. Although three rotor blades 412(1)-(3) are illustrated, other numbers of rotor blades are possible.

Illustrated within the fuselage 404 is a turboshaft 414 interoperably coupled to a pair of drive shafts 415(1)-(2) within the wing 406 and driven by a convertible engine 416. The convertible engine 416 may operate is a turbofan mode and in a turboshaft mode in which the convertible engine 416 drives the drive shafts 415(1)-(2) by transmitting torque through the turboshaft 414 through the wing to a wing gearbox 409. The wing gearbox 409 transmits torque to the pylon gearbox 408 in the converting pylon 402 via a single shaft 403 to power the plurality of rotor blades 412(1)-(3), about which the single shaft 403 the converting pylon 402 is rotatable. In a typical embodiment, the turboshaft mode is used for at least one of low-speed flight and vertical takeoff and landing ("VTOL"). In similar fashion, in some embodiments, in high-speed flight, the rotor 410 turns off and the rotor blades 412(1)-(3) may fold and the turbofan mode be used.

The wing gearbox 409 allows the single shaft 403 through a spindle of the converting pylon 402 so that the converting pylon 402 may be rotated between a vertical VTOL mode and an airplane mode as illustrated in FIG. 4 for, for example, one or more of low-speed flight and VTOL. In high speed flight the rotors turn off and/or fold and the turbofan mode is used. Use of a plurality of drive shafts such as the drive shafts 415(1) and 415(2) permits a reduction in driveshaft cross-sectional area, which allows for better wing shaping for high-speed flight, which can serve to improving one or more of fuel consumption, maximal cruise speed, and range of the tiltrotor VTOL aircraft 400.

Figure 5A:
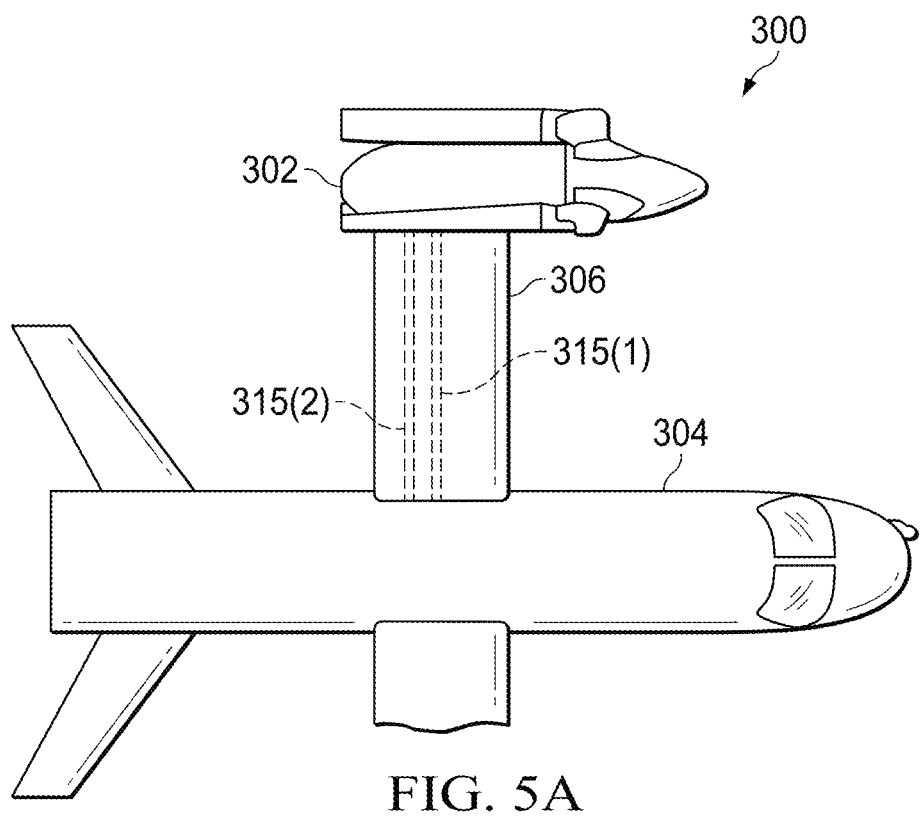
FIG. 5A-5B are partial schematic views of a multi-drive-shaft fixed-pylon aircraft.
Figure 5B:
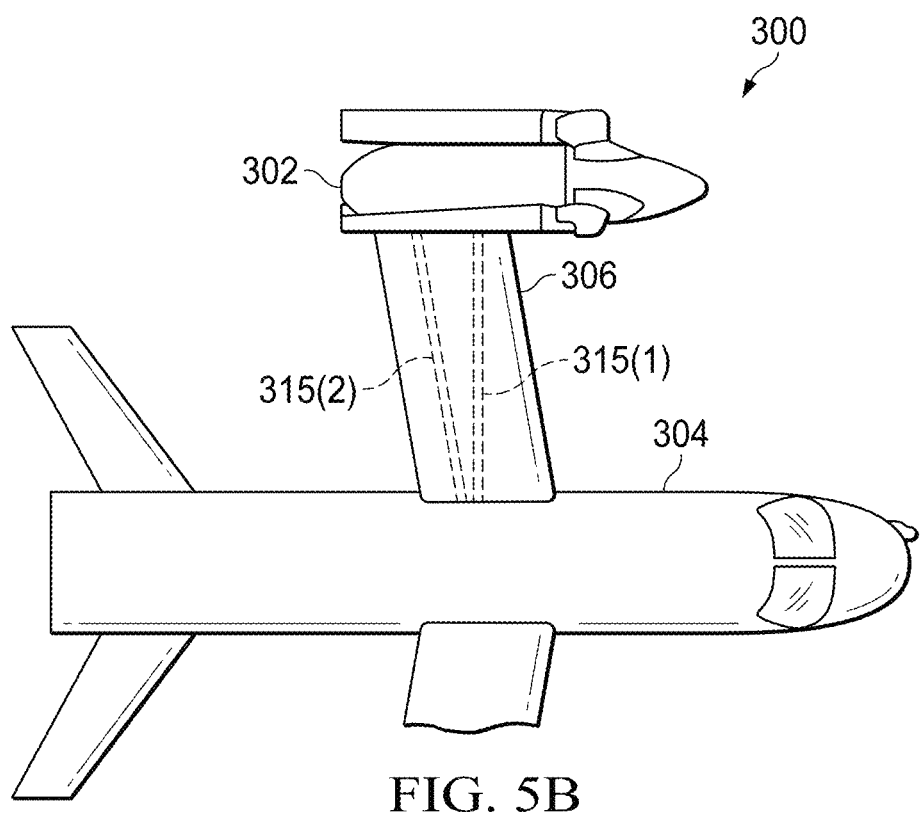

FIG. 5A-5B are partial schematic views of embodiments of the multi-drive-shaft fixed-pylon aircraft 300. Having multiple drive shafts allows the drive shafts to be positioned to fit varying wing planforms other than straight wings. Since the pylons are fixed, there is no need for a wing gearbox, which allows for a lighter system weight, lower complexity, and lower drag relative to a multi-drive-shaft system with converting pylons.

The aircraft 300 is shown in simplified schematic form as including the fixed pylon 302, the fuselage 304, and the wing 306 connected therebetween. Also shown are the plurality of drive shafts 315(1) and 315(2) extending within the wing 306.

In FIG. 5A, the wing 306 is a straight wing; as such, the drive shaft 315(1) and the drive shaft 315(2) are substantially parallel to one another. In contrast to FIG. 5A, in FIG. 5B, the wing 306 is a swept wing; as such, the drive shaft 315(1) and the drive shaft 315(2) are non-parallel to one another due to the swept configuration of the wing 306 as illustrated in FIG. 5B.

Figure 6A:
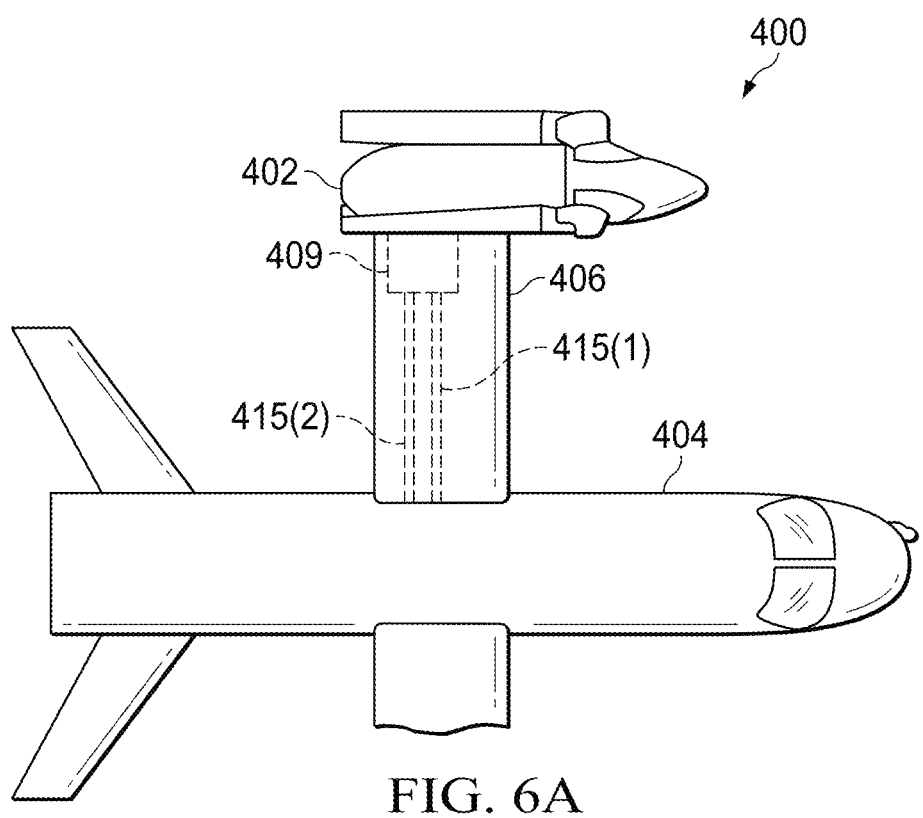
FIG. 6A-6B are partial schematic views of multi-drive-shaft convertible-pylon aircraft.
Figure 6B:
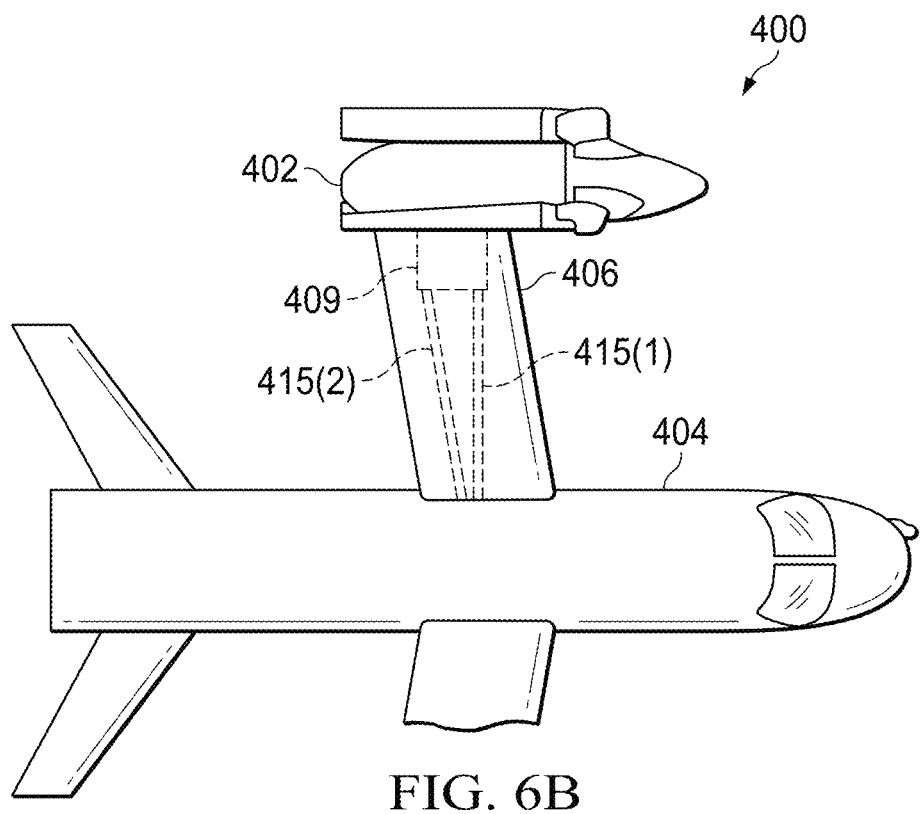

FIG. 6A-6B are partial schematic views of the multi-drive-shaft convertible-pylon aircraft 400. Having multiple drive shafts allows the drive shafts to be positioned to fit varying wing planforms other than a straight wing. Since in FIGS. 6A-6B, the converting pylon needs to convert, a wing gearbox is used to connect multiple drive shafts from the wing to a single output shaft through a spindle into the converting pylon to power rotors in low-speed and VTOL modes.

The tiltrotor VTOL aircraft 400 is shown in simplified schematic form as including the converting pylon 402, the fuselage 404, and the wing 406 connected therebetween. Also shown are the plurality of drive shafts 415(1) and 415(2) extending within the wing 406 to the wing gearbox 409. In FIG. 6A, the wing 406 is a straight wing; as such, the drive shaft 415(1) and the drive shaft 415(2) are substantially parallel to one another. In contrast to FIG. 6A, in FIG. 6B, the wing 406 is a swept wing; as such, the drive shaft 415(1) and the drive shaft 415(2) are non-parallel to one another due to the swept configuration of the wing 406 as illustrated in FIG. 6B.

In various embodiments discussed above, an engine is located in a fuselage of an aircraft. However, a convertible engine could be placed in a pylon of the aircraft and cross-shafting with multiple cross shafts between the pylon-located engines utilized. Moreover, even though a convertible engine is illustrated and discussed herein, separate engines could be employed in which one or more engines provide rotor torque and other one or more engines are turbofan (i.e., jet) engines. Moreover, although various embodiments are illustrated relative to a VTOL tiltrotor aircraft, teachings herein need not necessarily be limited to VTOL or tiltrotor aircraft.

As used herein, the terms connect, connection, connected, in connection with, and connecting may be used to mean in direct connection with. Similarly, the terms couple, coupling, and coupled may be used to mean coupled directly or via one or more elements. Conditional language used herein, such as, among others, can, might, may, e.g., and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The terms substantially, approximately, and about are each defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as substantially, approximately, and about may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term comprising within the claims is intended to mean including at least such that the recited listing of elements in a claim are an open group. The terms a, an and other singular terms are intended to include the plural forms thereof unless specifically excluded.

What is claimed is:

1. An aircraft comprising:
   a fuselage;
   a pylon;
   a wing positioned between the fuselage and the pylon;
   a rotor associated with the pylon; and
   a plurality of drive shafts located inside the wing;
   wherein the plurality of drive shafts comprise a first drive shaft and a second drive shaft that are positioned alongside each other and extend along at least a portion of a longitudinal length of the wing between the fuselage and the pylon, and are separated by a gap that extends along at least a portion of the longitudinal length of the wing between the fuselage and the pylon.

2. The aircraft of claim 1, wherein the pylon is a converting pylon.

3. The aircraft of claim 2, comprising a wing gearbox interoperably coupled to the plurality of drive shafts and outputting torque to drive the rotor via a single shaft.

4. The aircraft of claim 1, wherein the pylon is a fixed pylon.

5. The aircraft of claim 1, comprising a convertible engine operable in a turboshaft mode and a turbofan mode.

6. The aircraft of claim 5, wherein the convertible engine is located in the fuselage.

7. The aircraft of claim 1, comprising:
   a first engine adapted to drive the rotor; and
   a second engine adapted to operate in a turbofan mode.

8. The aircraft of claim 1, wherein the aircraft is a vertical-takeoff-and-landing ("VTOL") aircraft.

9. The aircraft of claim 1, comprising a gearbox located within the pylon.

10. The aircraft of claim 1, wherein the wing is a straight wing.

11. The aircraft of claim 10, wherein the first drive shaft and the second drive shaft of the plurality of drive shafts are parallel to one another.

12. The aircraft of claim 1, wherein the wing is a swept wing.

13. The aircraft of claim 12, wherein the first drive shaft and the second drive shaft of the plurality of drive shafts are non-parallel to one another.

14. An aircraft comprising:
   a wing positioned between a fuselage and a pylon of the aircraft;
   a convertible engine;
   a rotor associated with the pylon; and
   a plurality of drive shafts located in the wing;
   wherein the plurality of drive shafts comprise a first drive shaft and a second drive shaft that are positioned alongside each other and extend along at least a portion of a longitudinal length of the wing between the fuselage and the pylon, and are separated by a gap that extends along at least a portion of the longitudinal length of the wing between the fuselage and the pylon.

15. The aircraft of claim 14, wherein the convertible engine is operable in a turbofan mode and a turboshaft mode.

16. The aircraft of claim 14, wherein the plurality of drive shafts are parallel to one another.

17. The aircraft of claim 14, wherein the plurality of drive shafts are non-parallel to one another.

18. A method of powering an aircraft, the method comprising:

generating torque, via a convertible engine operable in a turbofan mode and a turboshaft mode;
a plurality of drive shafts located within a wing of the aircraft:
receiving the generated torque; and
transmitting torque to drive a rotor associated with a pylon of the aircraft;
wherein the plurality of drive shafts comprise a first drive shaft and a second drive shaft that are positioned alongside each other and extend along at least a portion of a longitudinal length of the wing between a fuselage and the pylon, and are separated by a gap that extends along at least a portion of the longitudinal length of the wing between the fuselage and the pylon.

19. The method of claim 18, wherein:
the transmitting is performed via a wing gearbox and a pylon gearbox; and
the pylon is a converting pylon.

\* \* \* \* \*